US006181790B1

(12) United States Patent
Saso et al.

(10) Patent No.: US 6,181,790 B1

(45) Date of Patent: Jan. 30, 2001

(54) ELECTROMAGNETIC RELAY USED IN A TELEPHONE EXCHANGE OR THE LIKE AND CONTACT SPRING ASSEMBLY FOR THE ELECTROMAGNETIC RELAY

(75) Inventors: Hirofumi Saso, Komoro; Ryuji Sasaki, Nagano, both of (JP)

(73) Assignee: Takamisawa Electric Co., Ltd., Tokyo (JP)

(*) Notice: Under 35 U.S.C. 154(b), the term of this patent shall be extended for 0 days.

(21) Appl. No.: 09/041,107

(22) Filed: Mar. 12, 1998

(30) Foreign Application Priority Data

May 30, 1997 (JP) .................................................. 9-142023

(51) Int. Cl.[7] .................................................. H01M 50/04

(52) U.S. Cl. ............................... 379/341; 335/78; 335/83

(58) Field of Search ............................... 335/78, 83, 128; 379/27, 29, 341

(56) References Cited

U.S. PATENT DOCUMENTS

| | | | | |
|---|---|---|---|---|
| 2,473,982 | | 6/1949 | Wood . | |
| 3,875,343 | * | 4/1975 | Quere | 379/27 |
| 4,008,447 | * | 2/1977 | Anderson et al. | 335/128 |
| 5,270,674 | * | 12/1993 | Nakanishi et al. | 335/78 |
| 5,309,623 | * | 5/1994 | Okamoto et al. | 335/78 |
| 5,337,029 | * | 8/1994 | Nobutoki et al. | 335/78 |
| 5,617,066 | * | 4/1997 | Dittmann et al. | 335/78 |
| 6,075,429 | * | 6/2000 | Uotome et al. | 335/78 |

FOREIGN PATENT DOCUMENTS

| | | |
|---|---|---|
| 0 523 855 | 1/1993 | (EP) . |
| 0 727 803 | 8/1996 | (EP) . |
| 61-1160 | 1/1986 | (JP) . |
| 9-288952 | 11/1997 | (JP) . |

OTHER PUBLICATIONS

Patent Abstracts of Japan, vol. 017, No. 549, Oct. 4, 1993 & JP 05–159678, Omron Corporation, Jun. 25, 1993.

Patent Abstracts of Japan, vol. 014, No. 194, Apr. 20, 1990 & JP 02–040828, Anritsu Corporation, Feb. 9, 1990.

* cited by examiner

*Primary Examiner*—David R. Hudspeth
*Assistant Examiner*—Martin Lerner
(74) *Attorney, Agent, or Firm*—Arent Fox Kintner Plotkin & Kahn, PLLC

(57) ABSTRACT

A contact spring assembly for an electromagnetic relay has an armature, a plurality of movable contact springs, and a plurality of transfer contact spring sets and a plurality of make contact spring sets. The armature is centrally placed in the contact spring assembly. Each of the movable contact springs is formed integrally with a corresponding hinge spring, and the movable contact springs are disposed on both sides of the armature in such a manner as to extend in parallel along a longitudinal direction of the armature. The transfer contact spring sets and make contact spring sets are constructed from the movable contact springs. This construction allows the contact spring assembly to be assembled on an electromagnetic relay simply and with high accuracy, and permits reductions in the size and power consumption of the electromagnetic relay.

18 Claims, 10 Drawing Sheets

ELECTROMAGNETIC RELAY USED IN A TELEPHONE EXCHANGE OR THE LIKE AND CONTACT SPRING ASSEMBLY FOR THE ELECTROMAGNETIC RELAY

BACKGROUND OF THE INVENTION

1. Field of the Invention

The present invention relates to an electromagnetic relay and a contact spring assembly for the electromagnetic relay, and more particularly, to an electromagnetic relay used in a telephone exchange or the like and a contact spring assembly for the electromagnetic relay.

2. Description of the Related Art

Traditionally, lightning surge protection has been required for subscriber circuits in telephone exchanges. Since implementing this lightning surge protection capability with semiconductor devices is extremely costly, a plurality of electromagnetic relays are used in every subscriber circuit accommodated in a telephone exchange.

In recent years, reductions in size and power consumption have been demanded in various kinds of apparatus. For telephone exchanges also, the need has been increasing to reduce the size, cost, and power consumption of the telephone exchange by reducing the number of electromagnetic relays used.

Namely, in the telephone exchange, for example, three electromagnetic relays are provided for each subscriber circuit in the exchange, of which two electromagnetic relays control a connection operation of a test circuit to switch the mode between normal operation mode and test mode. The remaining electromagnetic relay is used for dial pulse transmission. Note that, in the test mode, all the connections on the three electromagnetic relays are reversed from that of the normal operation mode and testing is performed by the test circuit. The testing by the test circuit is, for example, performed once a day or once every few days, to check the impedance, connection, etc. from the exchange to the subscriber.

As described above, for each subscriber circuit (test circuit) in the telephone exchange, for example, three electromagnetic relays (two for the test circuit), each with two transfer contact spring sets, have been used. Since these electromagnetic relays have to be provided for each subscriber circuit, such a configuration has been a major factor working against a reduction in the size and cost of the exchange.

The prior art electromagnetic relays and contact spring assemblies for the electromagnetic relays and problems thereof will be described in detail later with reference to the drawings.

SUMMARY OF THE INVENTION

An object of the present invention is to provide an electromagnetic relay that can be assembled simply and with high accuracy, and that is suited to size and power consumption reductions. It is also an object of the present invention to provide a contact spring assembly for an electromagnetic relay, suitable for use with a test circuit of a telephone exchange, and to reduce the size, cost, and power consumption of the exchange by reducing the number of electromagnetic relays used.

According to the present invention, there is provided a contact spring assembly for an electromagnetic relay, comprising an armature centrally placed in the contact spring assembly; a plurality of movable contact springs each formed integrally with a corresponding hinge spring and disposed on both sides of the armature in such a manner as to extend in parallel along a longitudinal direction of the armature; and a plurality of transfer contact spring sets and a plurality of make contact spring sets constructed from the movable contact springs.

The transfer contact spring sets and the make contact spring sets may be disposed, as two sets, on each side of the armature in such a manner as to be symmetrical about the armature. The contact spring assembly may be used to control a connection operation of a test circuit in a telephone exchange.

Further, according to the present invention, there is provided an electromagnetic relay comprising a stationary contact spring block provided with a plurality of stationary contacts; a movable contact spring block provided with a plurality of movable contacts corresponding to the plurality of stationary contacts, and comprising an armature centrally placed in the contact spring assembly, a plurality of movable contact springs each formed integrally with a corresponding hinge spring and disposed on both sides of the armature in such a manner as to extend in parallel along a longitudinal direction of the armature, and a plurality of transfer contact spring sets constructed from the movable contact springs; and an electromagnet block for controlling an attraction of the armature and thereby controlling connections between the movable contacts and the stationary contacts corresponding to the movable contacts.

The transfer contact spring sets may be disposed on each side of the armature in such a manner as to be symmetrical about the armature.

In addition, according to the present invention, there is provided an electromagnetic relay comprising a stationary contact spring block provided with a plurality of stationary contacts; a movable contact spring block provided with a plurality of movable contacts corresponding to the plurality of stationary contacts, and comprising an armature centrally placed in the contact spring assembly, a plurality of movable contact springs each formed integrally with a corresponding hinge spring and disposed on both sides of the armature in such a manner as to extend in parallel along a longitudinal direction of the armature, and a plurality of make contact spring sets constructed from the movable contact springs; and an electromagnet block for controlling an attraction of the armature and thereby controlling connections between the movable contacts and the stationary contacts corresponding to the movable contacts.

The make contact spring sets may be disposed on each side of the armature in such a manner as to be symmetrical about the armature.

According to the present invention, there is also provided an electromagnetic relay comprising a stationary contact spring block provided with a plurality of stationary contacts; a movable contact spring block provided with a plurality of movable contacts corresponding to the plurality of stationary contacts, and comprising an armature centrally placed in the contact spring assembly, a plurality of movable contact springs each formed integrally with a corresponding hinge spring and disposed on both sides of the armature in such a manner as to extend in parallel along a longitudinal direction of the armature, and a plurality of transfer contact spring sets and a plurality of make contact spring sets constructed from the movable contact springs; and an electromagnet block for controlling an attraction of the armature and thereby controlling connections between the movable contacts and the stationary contacts corresponding to the movable contacts.

The transfer contact spring sets and the make contact spring sets may be disposed, as two sets, on each side of the armature in such a manner as to be symmetrical about the armature.

An end portion of each hinge spring on the movable contact spring block may be welded to a corresponding spring terminal on the stationary contact spring block, and the movable contact spring block may be attached to the stationary contact spring block by utilizing the resilience of each of the hinge springs.

The end portion of each hinge spring may have an open-end slit portion, and the open-ended slit portion may be welded to the corresponding spring terminal by laser welding. The electromagnetic relay may be used to control a connection operation of a test circuit in a telephone exchange, and the connection control of the test circuit may be performed using one electromagnetic relay.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Before describing the preferred embodiments of the present invention, prior art electromagnetic relays and the problems associated with the prior art electromagnetic relays will be described with reference to drawings.

Lightning surge protection is traditionally required for subscriber circuits in telephone exchanges. Since implementing this lightning surge protection capability with semiconductor devices is extremely costly, electromagnetic relays are used in subscriber circuits in telephone exchanges. This situation is expected to continue into the future.

Figure 1:
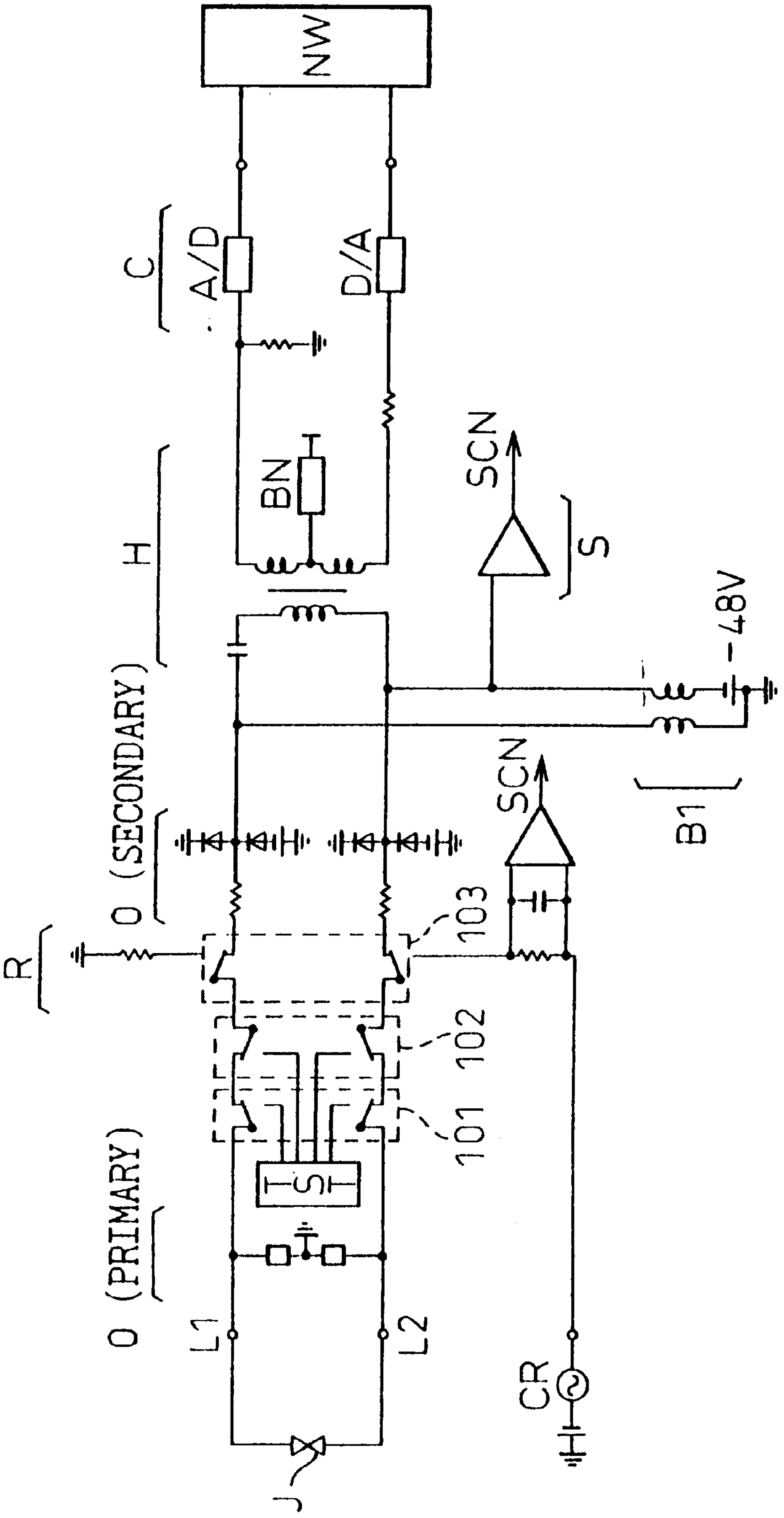
Fig. 1 PRIOR ART
FIG. 1 is a circuit diagram showing a typical configuration of a subscriber circuit in a telephone exchange.

FIG. 1 is a circuit diagram showing a typical configuration of a subscriber circuit in a telephone exchange.

In FIG. 1, reference character J is a subscriber, B1 is a power supply, O is an overvoltage protection block for protecting the subscriber circuit from large voltages due to lightning and the like, R is a ringing circuit (dial pulse output circuit) for sending a ringing tone to the subscriber J, C is a codec for performing conversion between voice signal and PCM signal, H is a hybrid for performing two-wire to four-wire conversion, and TST is a test circuit. In FIG. 1, two overvoltage protection blocks O are provided, one each at the primary and secondary sides.

The power supply B1 is connected to communication lines L1 and L2, and supplies a constant current to the communication lines L1 and L2 when the subscriber J goes off-hook. At this time, the power supply B1 presents a high impedance to the AC signal (voice signal) so that the signal is not attenuated.

Three electromagnetic relays 101, 102, and 103 are provided for each subscriber circuit in the exchange, of which the two electromagnetic relays 101 and 102 control the connection of the test circuit TST to switch the mode between normal operation mode and test mode. The remaining electromagnetic relay 103 is used for dial pulse transmission.

FIG. 1 shows the condition in the normal operation mode (test off); in the test mode (test on), all the connections on the electromagnetic relays 101, 102, and 103 are reversed and testing is performed by the test circuit TST. The testing by the test circuit TST is performed once a day or once every few days, to check the impedance, connection, etc. from the exchange to the subscriber J.

Figure 2A:
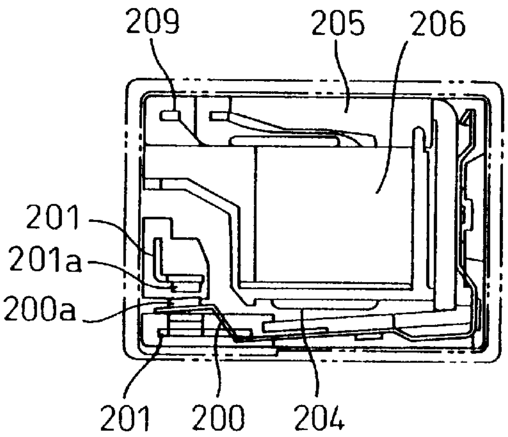
Fig. 2A PRIOR ART
FIGS. 2A, 2B, and 2C are diagrams showing one example of a prior art electromagnetic relay construction that uses a single movable contact spring.
Figure 2B:
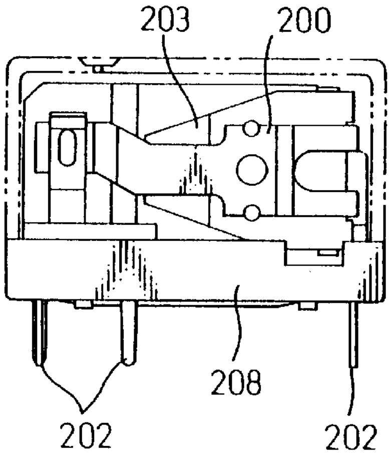
Fig. 2B PRIOR ART
Figure 2C:
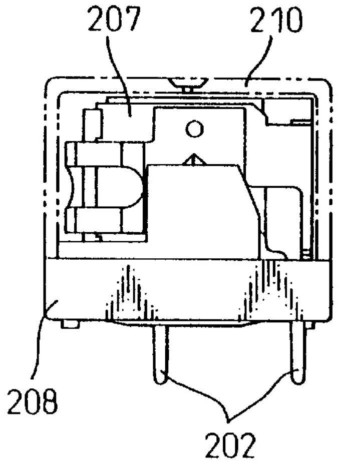
Fig. 2C PRIOR ART
Figure 3A:
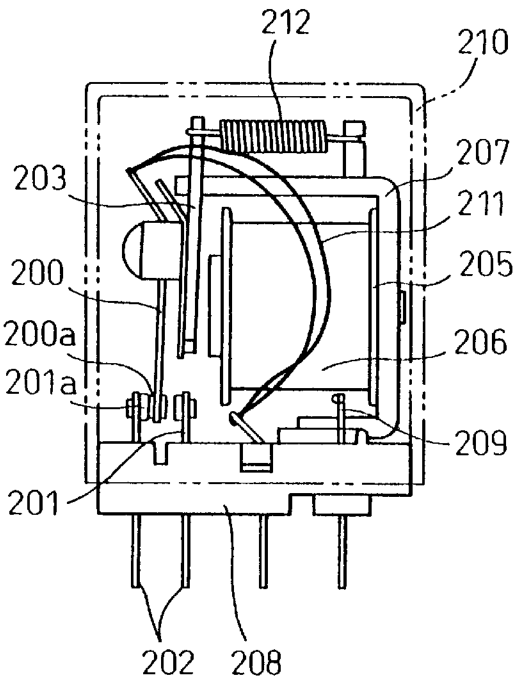
Fig. 3A PRIOR ART
FIGS. 3A and 3B are diagrams showing one example of a prior art electromagnetic relay construction that uses a plurality of (four) movable contact springs.
Figure 3B:
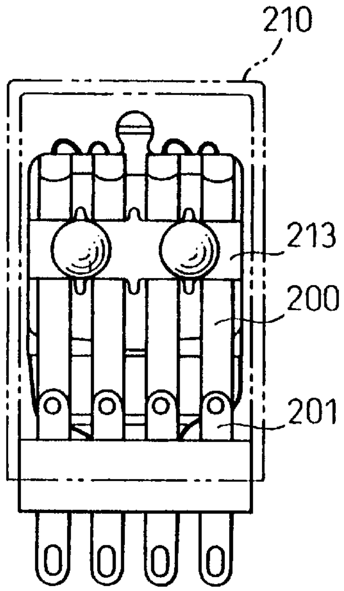
Fig. 3B PRIOR ART

FIGS. 2A to 2C are diagrams showing one example of a prior art electromagnetic relay construction that uses a single movable contact spring. FIGS. 3A to 3B are diagrams showing one example of a prior art electromagnetic relay construction that uses a plurality of (four) movable contact springs. Here, FIG. 2A shows a plan view, FIG. 2B a front view, and FIG. 2C a side view. Similarly, FIG. 3A shows a front view and FIG. 3B a side view.

As shown in FIGS. 2A to 2C and FIGS. 3A and 3B, the prior art electromagnetic relays comprise such discrete parts as a movable spring 200, a stationary spring 201, an array of externally extending terminal leads 202, an armature 203, and an electromagnet block (iron core 204, coil bobbin 205, wire 206, and yoke 207), which are individually assembled onto a base 208. Such construction has not only hindered the improvement of assembly accuracy but also required increased man-hours for assembly. In FIGS. 2A to 2C and FIGS. 3A and 3B, reference numeral 200*a* indicates a movable contact, 201*a* a stationary contact, 209 a coil terminal, 210 a cover, 211 a lead wire, 212 a spring, and 213 a movable spring mold.

As shown in FIGS. 2A to 2C, the movable spring 200 in the prior art electromagnetic relay, for example, of a single pole type is welded directly to the armature 203, etc. On the other hand, in the electromagnetic relay using a plurality of springs 200 (double- or multiple-pole type), as shown in FIGS. 3A and 3B, the movable spring mold 213 is used and, in addition, a return spring for forced restoring, such as the spring 212, is used. This has resulted in increased complexity of assembly.

Furthermore, for each subscriber circuit (test circuit TST) in the telephone exchange, for example, three electromagnetic relays (two for the test circuit), each with two transfer contact spring sets, have been used. Since these electromagnetic relays have to be provided for each subscriber circuit, such a configuration has been a major factor working against the reduction of the size and cost of the exchange. Moreover, because of the cost involved in the provision of these electromagnetic relays, such a configuration has impeded the effort to reduce the cost of the telephone exchange.

One embodiment of the electromagnetic relay and the contact spring assembly for the electromagnetic relay according to the present invention will be described below with reference to drawings.

Figure 4A:
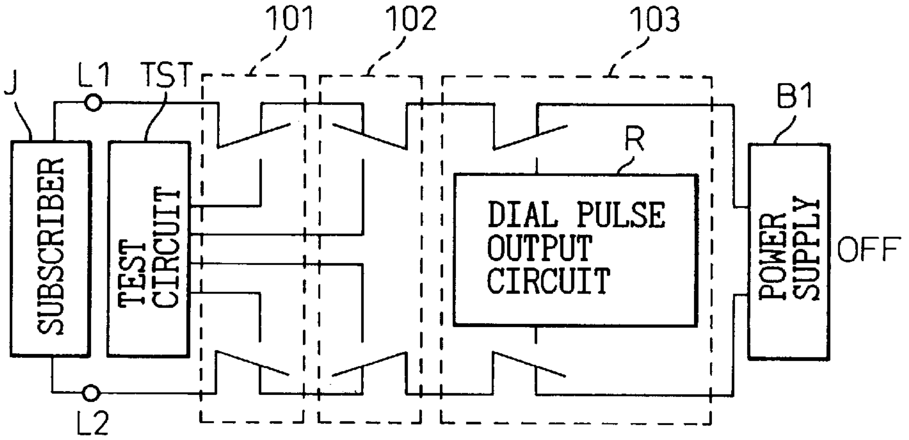
FIGS. 4A and 4B are diagrams showing a test switching circuit in the subscriber circuit of FIG. 1 and an equivalent circuit for the same.
Figure 4A:
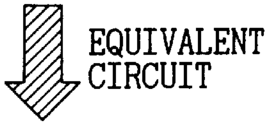
Figure 4B:
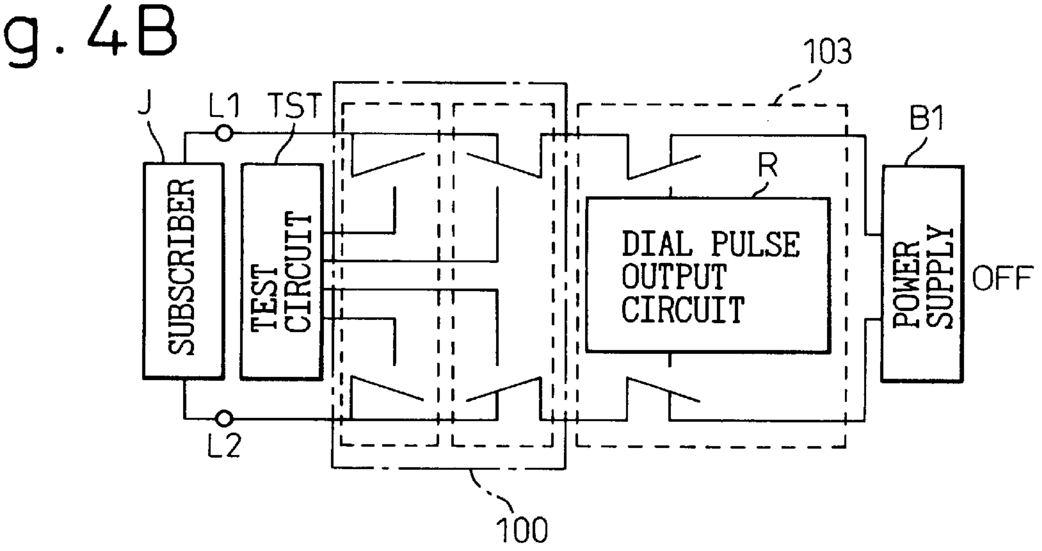

FIGS. 4A and 4B are diagrams showing a test switching circuit in the subscriber circuit of FIG. 1 and an equivalent circuit for the same. FIG. 4A corresponds to the configuration of FIG. 1, and FIG. 4B concerns the configuration applied to the electromagnetic relay according to the embodiment of the invention hereinafter described.

As shown in FIG. 4A, three electromagnetic relays 101, 102, and 103, each having two transfer contact spring sets, are provided for each subscriber circuit in the conventional exchange, of which the two electromagnetic relays 101 and 102, each with two transfer contact spring sets, are used to control the connection of the test circuit TST, and the remaining electromagnetic relay 103 is used to control dial pulse transmission.

The equivalent circuit shown in FIG. 4B is applied to the electromagnetic relay and the contact spring assembly for the electromagnetic relay according to the present invention. More specifically, in the embodiment hereinafter described, the two electromagnetic relays 101 and 102 are combined into one electromagnetic relay 100, with a pair of make contact spring sets provided in place of the two-transfer electromagnetic relay 101 and a pair of transfer contact spring sets in place of the two-transfer electromagnetic relay 102 to construct the contact spring assembly for the electromagnetic relay.

Here, FIGS. 4A and 4B show the condition in the normal operation mode (test off); in the test mode (test on), all the connections on the electromagnetic relays, 101, 102, and 103, and 100 and 103, are reversed and testing is performed by the test circuit TST. The make contacts on the electromagnetic relay 100 are set to the break side in the normal operation mode, and are switched to the make side in the test mode. The testing by the test circuit TST is performed once a day or once every few days, to check the impedance, connection, etc. from the exchange to the subscriber J.

In this way, in the electromagnetic relay (the contact spring assembly for the electromagnetic relay) of the present embodiment, the two electromagnetic relays 101 and 102 used, for example, in each subscriber circuit in the telephone exchange are combined into one electromagnetic relay 100 wherein the eight contacts on the two electromagnetic relays 101 and 102, (each relay having a pair of transfer contact spring sets), are replaced by the six contacts on the electromagnetic relay 100 having a pair of make contact spring sets and a pair of transfer contact spring sets. This permits reductions in the size, cost, and power consumption of the electromagnetic relay and the telephone exchange, etc. using the electromagnetic relay. Furthermore, by reducing the number of contacts from eight to six, it becomes possible to reduce the amount of noble metal used for the contacts, which contributes to further reducing the cost.

Figure 5:
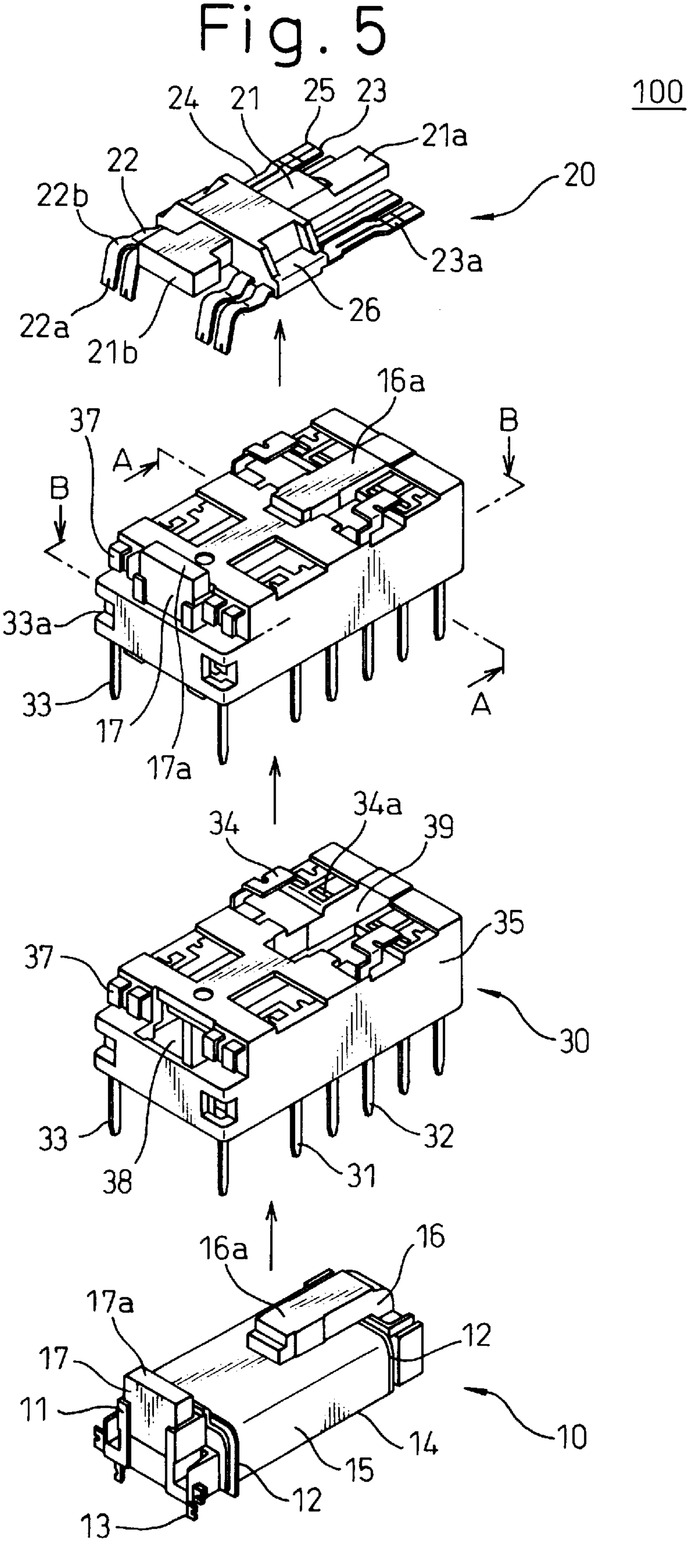
FIG. 5 is an exploded perspective view showing one embodiment of an electromagnetic relay according to the present invention.
Figure 6:
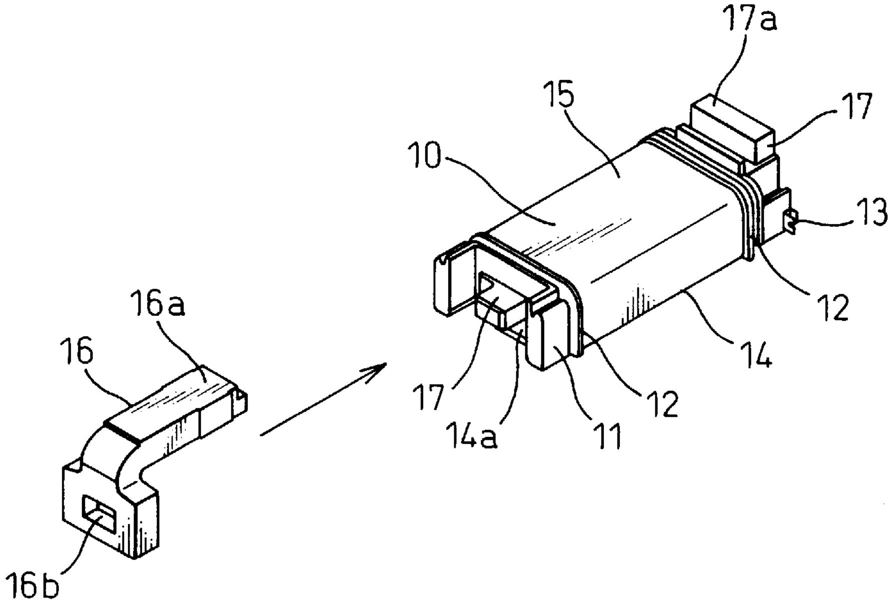
FIG. 6 is an exploded perspective view of an electromagnet block in the electromagnetic relay of the present invention.
Figure 7:
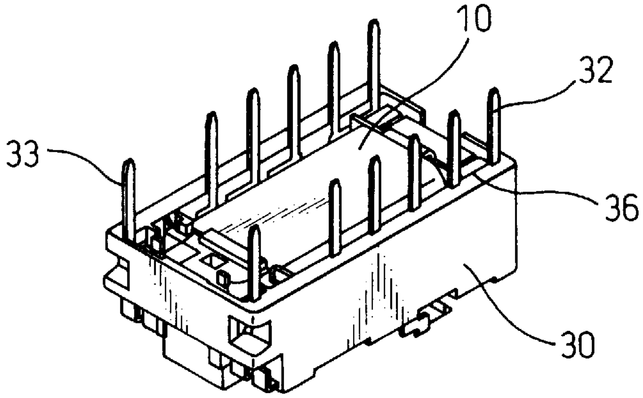
FIG. 7 is a perspective view showing the condition of the electromagnetic relay of the present invention, as viewed from the terminal lead side, when the electromagnet block is fitted into a stationary contact spring block.
Figure 8:
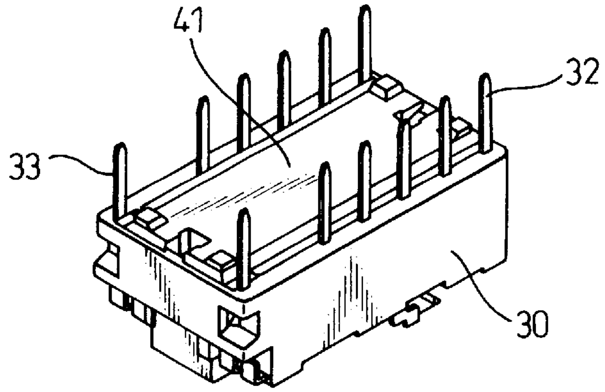
FIG. 8 is a perspective view showing the condition of the electromagnetic relay of the present invention, as viewed from the terminal lead side, after an insulating material has been filled into the gap between the stationary contact spring block and the electromagnet block.
Figure 9:
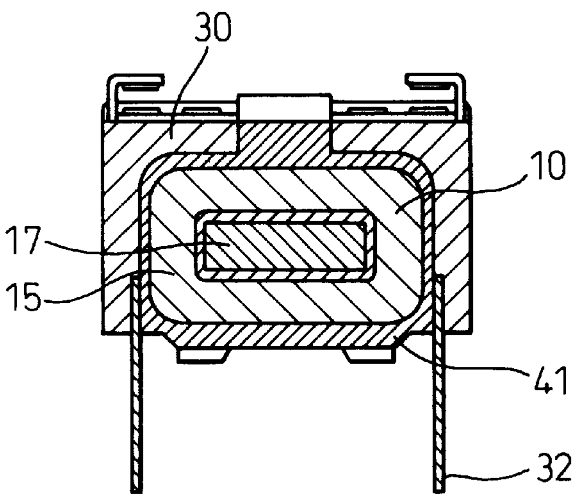
FIG. 9 is a cross-sectional view taken along line A—A in the exploded perspective view of FIG. 5.
Figure 10:
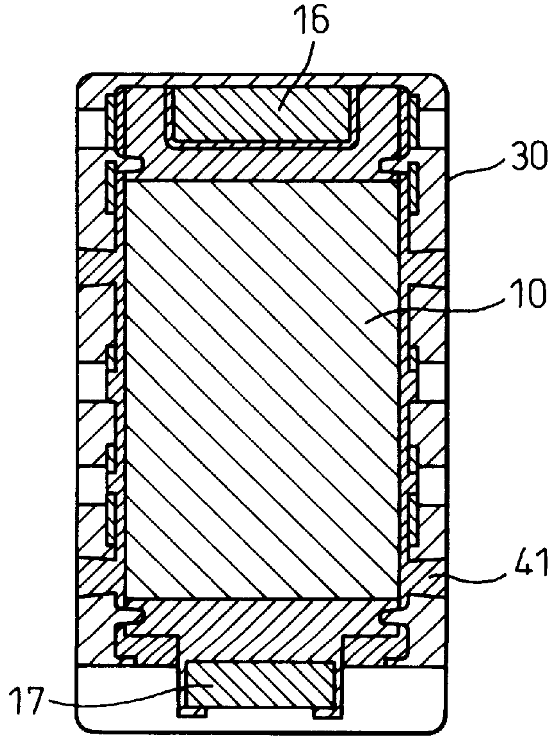
FIG. 10 is a cross-sectional view taken along line B—B in the exploded perspective view of FIG. 5.

FIG. 5 is an exploded perspective view showing one embodiment of the electromagnetic relay according to the present invention, and FIG. 6 is an exploded perspective view (a perspective view showing a portion broken away) of an electromagnet block in the electromagnetic relay of the present invention. Further, FIG. 7 is a perspective view showing the condition of the electromagnetic relay of the present invention, as viewed from the terminal lead side, when the electromagnet block is fitted into a stationary contact spring block, and FIG. 8 is a perspective view showing the condition of the electromagnetic relay of the present invention, as viewed from the terminal lead side, after an insulating material has been filled into the gap between the stationary contact spring block and the electromagnet block. FIG. 9 is a cross-sectional view taken along line A—A in the exploded perspective view of FIG. 5, and FIG. 10 is a cross-sectional view taken along line B—B in the exploded perspective view of FIG. 5. Further, FIG. 11 is an enlarged perspective view showing the movable contact spring block and stationary contact spring block in the electromagnetic relay of the present invention.

First, as shown in FIG. 5, the electromagnetic relay of the present embodiment comprises the electromagnet block 10, movable contact spring block 20, stationary contact spring block (box-shaped stationary contact spring block) 30, and a case (not shown).

As shown in FIG. 6, the electromagnet block 10 is constructed by insert-molding an iron core 17, bent in an L shape, and coil terminals 13 integrally with a bobbin mold 11 having flanges 12 and 12 on both sides thereof, by winding wire 15 around the body 14 of the bobbin mold 11, and by fitting a recessed joint portion 16*b* formed in an L-shaped magnetic pole piece 16 onto a protruding end portion 17*a* of the L-shaped iron core 17 inserted in a center hole 14*a* formed through the body 14, the other portion of the magnetic pole piece 16 being formed as a magnetic pole face 16*a*. The wound wire 15 is connected via the coil terminals 13 to coil terminals 33 on the stationary contact spring block 30.

Figure 11:
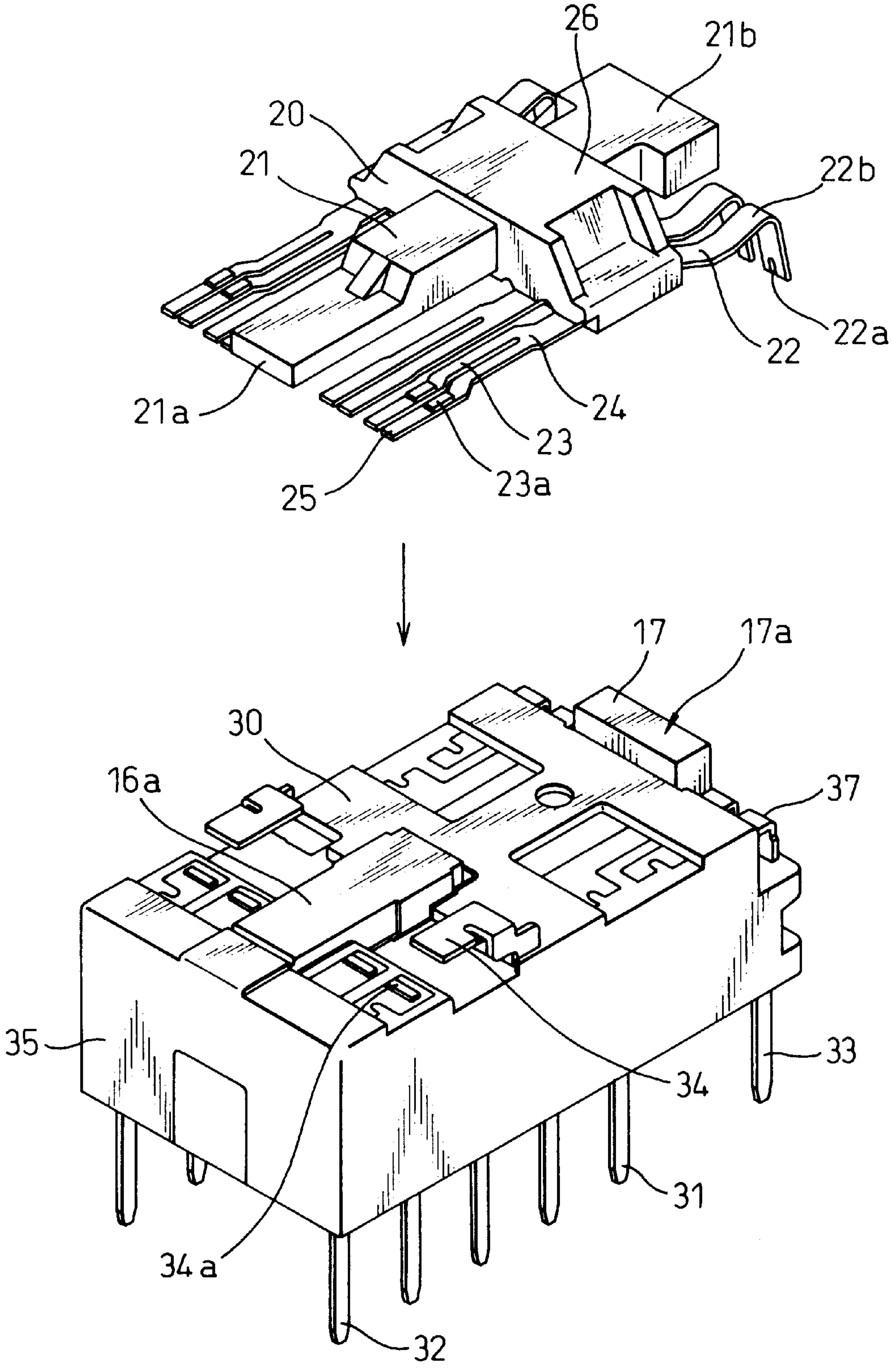
FIG. 11 is an enlarged perspective view showing the movable contact spring block and stationary contact spring block in the electromagnetic relay of the present invention.

As shown in FIGS. 5 and 11, the movable contact spring block 20 in the electromagnetic relay of the present embodiment comprises a centrally placed armature 21, and a plurality of movable springs 24, each acting as both a hinge spring 22 and a movable contact spring 23, that are placed on both sides of the armature 21 and extend along the longitudinal direction thereof; the armature 21 and the movable springs 24 are fabricated as a single unit using a molding material 26. The hinge springs 22 are positioned on the wider end side of the armature 21 integrally molded with the movable springs 24, and each hinge spring 22 has a dog-legged hinge portion 22*b*. The armature 21 is formed by stamping a plate-like magnetic material; the free end portion 21*a* of the armature 21 is disposed opposite the pole face 16*a* of the L-shaped magnetic pole piece 16 and one face at the other end of the armature 21 is contacted with an iron core hinge portion 17*a* of the L-shaped iron core 17, the portion supported by the iron core hinge portion 17*a* being the wider end portion 21*b*.

The stationary contact spring block (box-shaped stationary contact spring block) 30 is formed in the shape of a rectangular parallelepipedic, hollow box. In the inner wall surfaces 36 of the molding material 35 are formed, in an integral fashion, the externally extending movable contact spring terminals 31, stationary contact spring terminals 32, and coil terminals 33.

Then, as shown in FIGS. 7 and 8, the electromagnet block 10 is fitted inside the stationary contact spring block 30, and a mold filler 41 is poured into the gap between the stationary contact spring block 30 and the electromagnet block 10, thereby bonding the two blocks together while providing insulation between the coil and the contact springs. The case (not shown) is then mounted to cover the stationary contact spring block 30 from above, to complete the assembly of the electromagnetic relay. As earlier described, FIG. 9 shows an A—A cross section taken from FIG. 5, and FIG. 10 a B—B cross section taken from FIG. 5; as can be seen from FIGS. 9 and 10, the electromagnet block 10 and the stationary contact spring block 30 are constructed in an insulating structure.

As shown in FIG. 11, the stationary contact springs 34 of the externally extending stationary contact spring terminals 32 are linked integrally with the stationary contact spring terminal 32 side and are positioned opposite the movable contact springs 23; an appropriate bend is provided so as to form transfer contact sets (make and break contact sets) in accordance with the contact spring sets of the stationary contacts 34*a*. In the present embodiment, as can be seen from FIG. 11, a pair of transfer contact spring sets and a pair of make contact spring sets are formed to correspond with those in the equivalent circuit shown in FIG. 4B. These transfer contact spring sets and make contact spring sets are provided symmetrically about the armature 21.

The above-described mechanical components are unitized by mold forming to construct the electromagnet block 10, movable contact spring block 20, and stationary contact spring block 30. To assemble these blocks 10, 20, and 30 together, the electromagnet block 10 is inserted into the insertion holes 38 and 39 in the cavity of the stationary contact spring block 30 from the externally extending terminal side (the underside) thereof, as shown in the exploded perspective view of FIG. 5, and fixed in position. More specifically, the iron core hinge portion 17*a* of the iron core 17 is inserted through the insertion hole 38 formed in the cavity of the stationary contact spring block 30, and the pole face 16*a* of the pole piece 16 is inserted through the insertion hole 39 in such a manner as to protrude upwardly in FIG. 5.

After that, the movable contact spring block 20 is mounted onto the stationary contact spring block 30, and the free end portion 22*a* of each of the dog-legged hinge springs 22 is fastened rigidly to the corresponding spring terminal 37 provided on the stationary contact spring block 30.

Figure 12:
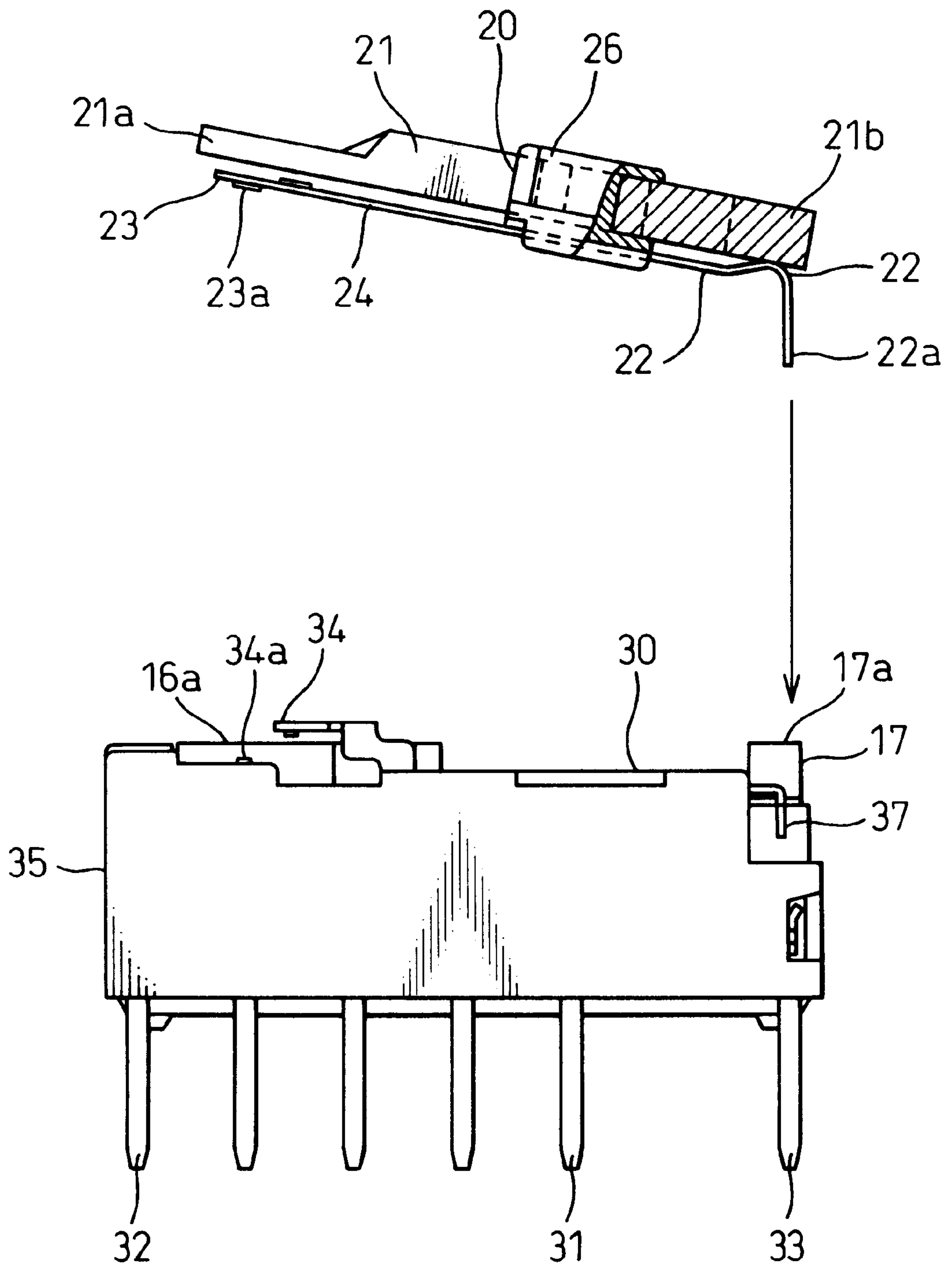
FIG. 12 is a diagram showing how the movable contact spring block is fitted onto the stationary contact spring block in the electromagnetic relay of the present invention.
Figure 13:
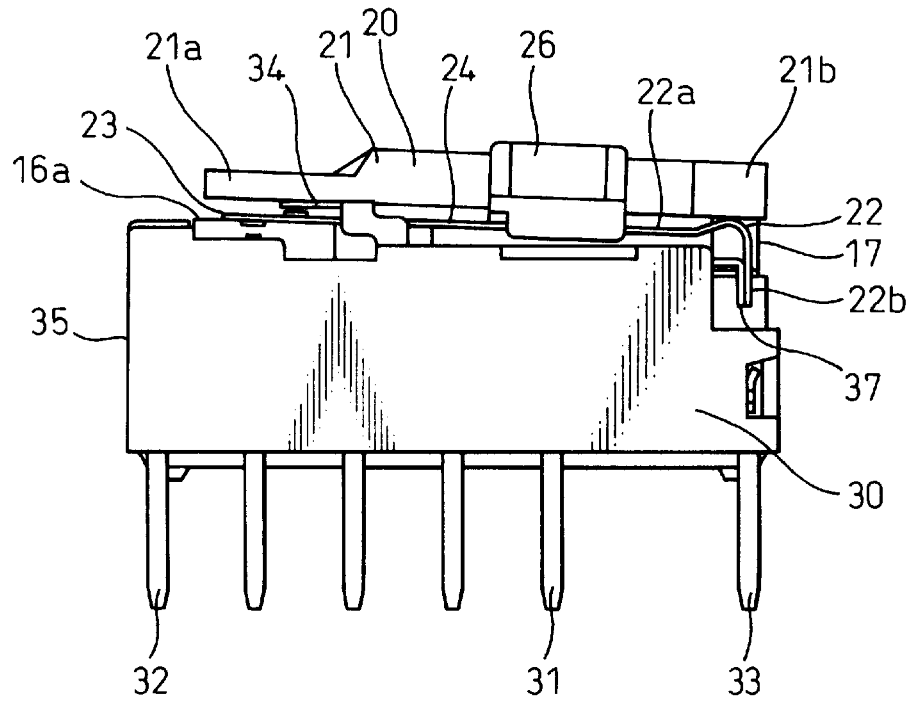
FIG. 13 is a diagram showing the condition of the electromagnetic relay of the present invention in which the movable contact spring block and the stationary contact spring block are fastened together.

FIG. 12 is a diagram showing how the movable contact spring block is fitted onto the stationary contact spring block in the electromagnetic relay of the present invention, and FIG. 13 is a diagram showing the condition of the electromagnetic relay of the present invention in which the movable contact spring block and the stationary contact spring block are fastened together. Further, FIG. 14 is a diagram for explaining how the hinge spring is welded to the spring terminal in the electromagnetic relay of FIG. 13.

As shown in FIGS. 12 and 13, the movable contact spring block 20 is mounted on the stationary contact spring block 30 by placing the free end portions 22*a* of the hinge springs 22 into intimate contact with the spring terminals 37 linked integrally with the externally extending movable contact spring terminals 31, and by welding them together by a laser or the like.

Figure 14:
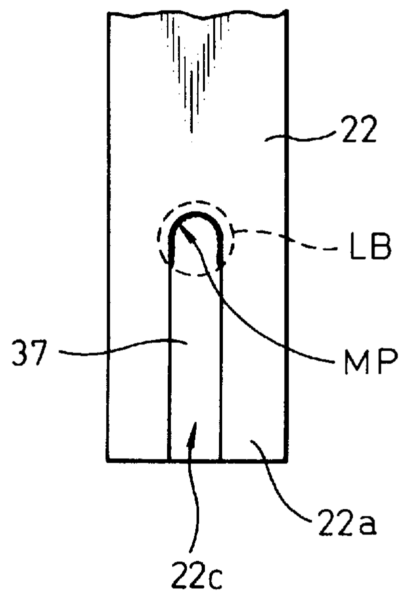
FIG. 14 is a diagram for explaining how a hinge spring is welded to a spring terminal in the electromagnetic relay of FIG. 13.

Here, as shown in FIG. 14, the end portion (free end portion 22*a*) of each hinge spring 22 (hinge portion 22*b*) on the movable contact spring block 20 has an open-ended slit portion 22*c;* by shining a laser beam LB on the upper end portion of the slit portion 22*c,* the hinge spring 22 and the spring terminal 37 are joined together with a molten portion MP, and by utilizing the resilience of each hinge spring 22 (hinge portion 22*b*), the movable contact spring block 20 is held to the stationary contact spring block 30. In the movable contact spring block 20, the springs on the free end side of the armature 21 opposite from the hinge springs 22 act as the movable springs 24 (movable contact springs 23). The reasons that the open-ended slit portion 22*c* is formed in the free end portion 22*a* of each hinge spring 22 are that it is easier to remove chips (pieces separated by cutting) when the spring is stamped by a stamping die, and that the curved end of the slit portion serves to increase the area of the molten portion MP to be welded by the laser beam LB focused into a spot. The fastening between the free end portion 22*a* of the hinge spring 22 and the spring terminal 37 can be accomplished not only by laser welding but also by various other techniques.

The above description has been given by taking an example in which the electromagnetic relay (contact spring assembly) is applied to a subscriber circuit in a telephone exchange, but it will be appreciated that the electromagnetic relay (contact spring assembly) can also be applied to various other apparatuses.

As described in detail above, according to the present invention, the electromagnetic relay comprises the centrally placed armature, movable contact springs formed integrally with the hinge springs and disposed on both sides of the armature in such a manner as to extend in parallel along the longitudinal direction thereof, and a plurality of transfer contact spring sets and a plurality of make contact spring sets constructed from the movable contact springs; the electromagnetic relay thus constructed can be assembled simply and with high accuracy, and is suited to size and power consumption reductions. Furthermore, the present invention provides a contact spring assembly, for the electromagnetic relay, that is suitable for use with a test circuit of a telephone exchange, and that permits a reduction in the number of electromagnetic relays used, thereby achieving reductions in the size, cost, and power consumption of the telephone exchange.

Many different embodiments of the present invention may be constructed without departing from the spirit and scope of the present invention, and it should be understood that the present invention is not limited to the specific embodiments described in this specification, except as defined in the appended claims.

What is claimed is:

1. A contact spring assembly for an electromagnetic relay, comprising:

an armature centrally placed in said contact spring assembly;

a plurality of movable contact springs each formed integrally with a corresponding hinge spring and disposed on both sides of said armature in such a manner as to extend in parallel along a longitudinal direction of said armature; and a plurality of transfer contact spring sets and a plurality of make contact spring sets constructed from said movable contact springs, each contact of said transfer contact spring sets and each contact of said make contact spring sets being disposed on one side of the longitudinal direction of said armature, and said hinge springs being disposed on the other side of the longitudinal direction of said armature.

2. A contact spring assembly for an electromagnetic relay as claimed in claim 1, wherein said transfer contact spring sets and said make contact spring sets are disposed, as two sets, on each side of said armature in such a manner as to be symmetrical about said armature.

3. A contact spring assembly for an electromagnetic relay as claimed in claim 1, wherein said contact spring assembly is used to control a connection operation of a test circuit in a telephone exchange.

4. An electromagnetic relay comprising:

a stationary contact spring block provided with a plurality of stationary contacts;

a movable contact spring block provided with a plurality of movable contacts corresponding to said plurality of stationary contacts, and comprising an armature centrally placed in said contact spring assembly, a plurality of movable contact springs each formed integrally with a corresponding hinge spring and disposed on both sides of said armature in such a manner as to extend in parallel along a longitudinal direction of said armature, and a plurality of transfer contact spring sets constructed from said movable contact springs; and an electromagnet block for controlling an attraction of said armature and thereby controlling connections between said movable contacts and said stationary contacts corresponding to said movable contacts, said movable contacts and said stationary contacts being disposed on one side of the longitudinal direction of said armature, said hinge springs being disposed on the other side of the longitudinal direction of said armature, and an end portion of each of said hinge springs being coupled to a corresponding spring terminal on said stationary contact spring block.

5. An electromagnetic relay as claimed in claim 4, wherein said transfer contact spring sets are disposed on each side of said armature in such a manner as to be symmetrical about said armature.

6. An electromagnetic relay as claimed in claim 4, wherein an end portion of each hinge spring on said movable contact spring block is welded to a corresponding spring terminal on said stationary contact spring block, and said movable contact spring block is attached to said stationary contact spring block by utilizing a resilience of each of said hinge springs.

7. An electromagnetic relay as claimed in claim 6, wherein said end portion of each hinge spring has an open-end slit portion, and said open-ended slit portion is welded to said corresponding spring terminal by laser welding.

8. An electromagnetic relay as claimed in claim 4, wherein said electromagnetic relay is used to control a connection operation of a test circuit in a telephone exchange, and the connection control of said test circuit is performed using one electromagnetic relay.

9. An electromagnetic relay comprising:

a stationary contact spring block provided with a plurality of stationary contacts;

a movable contact spring block provided with a plurality of movable contacts corresponding to said plurality of stationary contacts, and comprising an armature centrally placed in said contact spring assembly, a plurality of movable contact springs each formed integrally with a corresponding hinge spring and disposed on both sides of said armature in such a manner as to extend in parallel along a longitudinal direction of said armature, and a plurality of make contact spring sets constructed from said movable contact springs; and an electromagnet block for controlling an attraction of said armature and thereby controlling connections between said movable contacts and said stationary contacts corresponding to said movable contacts, said movable contacts and said stationary contacts being disposed on one side of the longitudinal direction of said armature, said hinge springs being disposed on the other side of the longitudinal direciton of said armature, and an end portion of each of said hinge springs being coupled to a corresponding spring terminal on said stationary contact spring block.

10. An electromagnetic relay as claimed in claim 9, wherein said make contact spring sets are disposed on each side of said armature in such a manner as to be symmetrical about said armature.

11. An electromagnetic relay as claimed in claim 9, wherein an end portion of each hinge spring on said movable contact spring block is welded to a corresponding spring terminal on said stationary contact spring block, and said movable contact spring block is attached to said stationary contact spring block by utilizing a resilience of each of said hinge springs.

12. An electromagnetic relay as claimed in claim 11, wherein said end portion of each hinge spring has an open-end slit portion, and said open-ended slit portion is welded to said corresponding spring terminal by laser welding.

13. An electromagnetic relay as claimed in claim 9, wherein said electromagnetic relay is used to control a connection operation of a test circuit in a telephone exchange, and the connection control of said test circuit is performed using one electromagnetic relay.

14. An electromagnetic relay comprising:

a stationary contact spring block provided with a plurality of stationary contacts;

a movable contact spring block provided with a plurality of movable contacts corresponding to said plurality of stationary contacts, and comprising an armature centrally placed in said contact spring assembly, a plurality of movable contact springs each formed integrally with a corresponding hinge spring and disposed on both sides of said armature in such a manner as to extend in parallel along a longitudinal direction of said armature, and a plurality of transfer contact spring sets and a plurality of make contact spring sets constructed from said movable contact springs; and an electromagnet block for controlling an attraction of said armature and thereby controlling connections between said movable contacts and said stationary contacts corresponding to said movable contacts, said movable contacts and said stationary contacts being disposed on one side of the longitudinal direction of said armature, said hinge springs being disposed on the other side of the longitudinal direction of said armature, and an end portion of each of said hinge springs being coupled to a corresponding spring terminal on said stationary contact spring block.

15. An electromagnetic relay as claimed in claim 14, wherein said transfer contact spring sets and said make contact spring sets are disposed, as two sets, on each side of said armature in such a manner as to be symmetrical about said armature.

16. An electromagnetic relay as claimed in claim 14, wherein an end portion of each hinge spring on said movable contact spring block is welded to a corresponding spring terminal on said stationary contact spring block, and said movable contact spring block is attached to said stationary contact spring block by utilizing a resilience of each of said hinge springs.

17. An electromagnetic relay as claimed in claim 16, wherein said end portion of each hinge spring has an open-end slit portion, and said open-ended slit portion is welded to said corresponding spring terminal by laser welding.

18. An electromagnetic relay as claimed in claim 14, wherein said electromagnetic relay is used to control a connection operation of a test circuit in a telephone exchange, and the connection control of said test circuit is performed using one electromagnetic relay.

* * * * *